United States Patent
Ishikawa et al.

(10) Patent No.: US 9,249,879 B2
(45) Date of Patent: Feb. 2, 2016

(54) HYDRAULIC DRIVE SYSTEM FOR HYDRAULIC WORKING MACHINE

(75) Inventors: Kouji Ishikawa, Kasumigaura (JP); Yusuke Kajita, Ushiku (JP); Hidetoshi Satake, Ishioka (JP); Takatoshi Ooki, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 404 days.

(21) Appl. No.: 13/805,913

(22) PCT Filed: Jul. 26, 2011

(86) PCT No.: PCT/JP2011/066988
§ 371 (c)(1),
(2), (4) Date: Dec. 20, 2012

(87) PCT Pub. No.: WO2012/026264
PCT Pub. Date: Mar. 1, 2012

(65) Prior Publication Data
US 2013/0139678 A1  Jun. 6, 2013

(30) Foreign Application Priority Data
Aug. 27, 2010  (JP) ................. 2010-190922

(51) Int. Cl.
*F16D 31/02* (2006.01)
*F16H 61/4043* (2010.01)
(Continued)

(52) U.S. Cl.
CPC ............ *F16H 61/4043* (2013.01); *E02F 3/962* (2013.01); *E02F 9/123* (2013.01); *E02F 9/128* (2013.01); *E02F 9/2282* (2013.01); *E02F 9/2285* (2013.01); *E02F 9/2296* (2013.01); *F15B 11/0406* (2013.01); *F16H 61/4052* (2013.01); *F16H 61/4061* (2013.01);
(Continued)

(58) Field of Classification Search
CPC ............ F16H 61/4017; F16H 61/4043; F16H 61/4052; F16H 61/4061; F16H 61/4148
USPC ..................................... 60/468, 493
See application file for complete search history.

(56) References Cited

U.S. PATENT DOCUMENTS 5,018,935 A * 5/1991 Gage ............................... 60/493
5,335,495 A   8/1994 Sato et al.
(Continued)

FOREIGN PATENT DOCUMENTS

JP   56-62402 A   5/1981
JP   05-6266 U   1/1993
(Continued)

*Primary Examiner* — Michael Leslie
(74) *Attorney, Agent, or Firm* — Mattingly & Malur, PC

(57) ABSTRACT

A hydraulic drive system designed so that while maintaining intact a structure of a relief valve having a shockless function, the drive unit hydraulic drive system facilitates changing a driving pressure or braking pressure of a hydraulic swing motor and hence, changing a maximum driving torque or braking torque of the hydraulic swing motor. Inside a swing motor unit is arranged a first swinging relief valve provided with a shockless function to limit a driving pressure or braking pressure of the hydraulic swing motor in order to prevent the pressure from exceeding a first setting pressure. Also, a second swinging relief valve is provided for limiting the driving pressure or braking pressure of the hydraulic swing motor in order to prevent the pressure from exceeding a second setting pressure that is lower than the first setting pressure.

8 Claims, 8 Drawing Sheets

(51) Int. Cl.

| | | |
|---|---|---|
| *F16H 61/4052* | (2010.01) | |
| *F16H 61/4061* | (2010.01) | |
| *E02F 9/12* | (2006.01) | |
| *E02F 9/22* | (2006.01) | |
| *F15B 11/04* | (2006.01) | |
| *E02F 3/96* | (2006.01) | |

(52) U.S. Cl.
CPC ............... *F15B2211/20546* (2013.01); *F15B 2211/50527* (2013.01); *F15B 2211/613* (2013.01); *F15B 2211/7058* (2013.01)

(56) References Cited

U.S. PATENT DOCUMENTS

| | | | |
|---|---|---|---|
| 5,938,170 A * | 8/1999 | Shimada et al. ........... 251/30.02 |
| 6,360,538 B1 | 3/2002 | McGowan et al. |
| 7,150,150 B2 * | 12/2006 | Bigo et al. ..................... 60/468 |
| 7,841,360 B2 | 11/2010 | Bruck et al. |
| 8,201,404 B2 * | 6/2012 | Satake ............................ 60/493 |
| 8,881,519 B2 * | 11/2014 | Kamimura ..................... 60/468 |
| 2008/0115848 A1 * | 5/2008 | Bruck et al. .................. 137/613 |

FOREIGN PATENT DOCUMENTS

| | | |
|---|---|---|
| JP | 06-173299 A | 6/1994 |
| JP | 10-030605 A | 2/1998 |
| JP | 11-013088 A | 1/1999 |
| JP | 2001-065504 A | 3/2001 |
| JP | 2008-530457 A | 8/2008 |
| JP | 2008-281208 A | 11/2008 |
| WO | 93/07394 A1 | 4/1993 |

* cited by examiner

HYDRAULIC DRIVE SYSTEM FOR HYDRAULIC WORKING MACHINE

TECHNICAL FIELD

The present invention relates to a hydraulic drive system equipped on a hydraulic excavator or the like to provide variability to a relief pressure of a hydraulic swing motor which drives a swing structure.

BACKGROUND ART

A hydraulic drive system for a hydraulic working machine having a swing structure, such as hydraulic excavators, includes a swing motor unit that has a hydraulic swing motor for driving the swing structure. The swing motor unit has a relief valve, called an overload relief valve, disposed thereinside. The relief valve is adapted to limit a supply pressure of a hydraulic fluid to or a discharge pressure thereof from the hydraulic swing motor in order to prevent the pressure from exceeding a predetermined level.

A relief valve having a shockless function to relieve a starting or stopping shock of swinging operations, as described in Patent Document 1, is known as an example of a relief valve used in a hydraulic swing motor.

Also known is a hydraulic drive system that enables, as described in Patent Document 2, a previously set pressure of a relief valve in a hydraulic swing motor, that is, a relief pressure, to be changed. Making the relief pressure changeable enables a driving pressure or braking pressure of the hydraulic swing motor to be changed and a maximum driving torque or braking torque thereof to be changed. According to Patent Document 2, the previously set pressure of the relief valve is changed according to a particular posture of a front work implement, and as an inertial mass of an upper swing structure changes according to the particular posture of the front work implement, the maximum driving torque or braking torque of the hydraulic swing motor is changed, thereby improving operability.

PRIOR ART LITERATURE

Patent Documents

Patent Document 1: JP,U 5-6266
Patent Document 2: JP,A 6-173299

SUMMARY OF THE INVENTION

Problems to be Solved by the Invention

As discussed above, such a relief valve with a shockless function as described in Patent Document 1 is known and in the technique of Patent Document 2, the previously set pressure of the relief valve in a hydraulic swing motor is rendered changeable. If the relief valve of the hydraulic swing motor in either of the two cases has the shockless function described in Patent Document 1 and enables the previously set pressure of the relief valve (i.e., the relief pressure) in the hydraulic swing motor to be changed as described in Patent Document 2, the shockless function of the relief valve will be effective for both relieving the starting or stopping shock of the swinging operations, and for changing the maximum driving torque or braking torque of the hydraulic swing motor.

A variable type of relief valve with a shockless function, however, requires a very complex mechanism and is therefore difficult to implement both structurally and in terms of price.

An object of the present invention is to provide a hydraulic drive system for a hydraulic working machine, designed so that while maintaining intact a structure of a relief valve having a shockless function, the drive unit hydraulic drive system facilitates changing a driving pressure or braking pressure of a hydraulic swing motor and hence, changing a maximum driving torque or braking torque of the hydraulic swing motor.

Means for Solving the Problems (1) In order to attain the above object, a hydraulic drive system for a hydraulic working machine, the working machine being equipped with a swing structure and a working implement, comprises: a hydraulic pump; a swing motor unit driven by a hydraulic fluid delivered from the hydraulic pump, the motor unit including a hydraulic swing motor for rotating the swing structure; a control valve including a swing-directional control valve, the control valve controlling flow of the hydraulic fluid supplied from the hydraulic pump to the hydraulic swing motor; a first swinging relief valve with a shockless function, disposed inside the swing motor unit, for limiting a driving pressure or braking pressure of the hydraulic swing motor in order to prevent the pressure from exceeding a first setting pressure; a second swinging relief valve for limiting the driving pressure or braking pressure of the hydraulic swing motor in order to prevent the pressure from exceeding a second setting pressure that is lower than the first setting pressure; and a selector for a selector for selecting either one of a first relief mode and a second relief mode, the first relief mode being a mode in which to leave relief characteristics of the first swinging relief valve operative intact, the second relief mode being a mode in which to provide relief characteristics obtained by reducing the first setting pressure of the relief characteristics of the first swinging relief valve to the second setting pressure of the second swinging relief valve.

In the thus-configured hydraulic drive system according to the present invention, upon the selector selecting the first relief mode, the relief characteristics of the first swinging relief valve remain operative intact and the shockless function of the first swinging relief valve is implemented, and upon the selector selecting the second relief mode, the new relief characteristics are obtained by reducing the first setting pressure of the relief characteristics of the first swinging relief valve to the second setting pressure of the second swinging relief valve.

In the first relief mode, the above relieves a starting or stopping shock of swinging operations, as in the case of the prior-art relief valve having a shockless function. In the second relief mode, by reducing the second setting pressure of the second swinging relief valve is set to a value between a relief starting pressure and first setting pressure of the first swinging relief valve, the above reduces the driving pressure or braking pressure of the hydraulic swing motor and implements the shockless function. This reduces the maximum driving torque or braking torque of the hydraulic swing motor and relieves the starting or stopping shock of the swinging operations for the shockless function.

This, in turn, allows the first swinging relief valve with the shockless function to maintain a structure of the relief valve intact, and at the same time, easily change the driving pressure or braking pressure of the hydraulic swing motor and hence, change the maximum driving torque or braking torque of the hydraulic swing motor.

(2) The hydraulic drive system for a hydraulic working machine according to the foregoing aspect of the present invention, wherein: the swing motor unit preferably includes an internal discharge hydraulic line positioned at a downstream side of the first swinging relief valve to cause a discharge fluid to flow therefrom, the internal discharge hydraulic line being connected to a tank, and a make-up check valve for replenishing an intake end of the hydraulic swing motor with hydraulic fluid from the internal discharge hydraulic line upon the hydraulic swing motor conducting a pumping action during a slowdown or stop of the swing structure; and the second swinging relief valve is connected at its downstream side to the internal discharge hydraulic line such that during hydraulic fluid replenishing from the make-up check valve, a discharge fluid from the second swinging relief valve joins that of the first swinging relief valve and both fluids are supplied to the make-up check valve.

Since the downstream side of the second swinging relief valve is thus connected to the internal discharge hydraulic line, the replenishment with hydraulic fluid from the make-up check valve as the hydraulic swing motor conducts the pumping action becomes reliable, which suppresses occurrence of cavitation of the hydraulic swing motor.

(3) In the hydraulic drive system for a hydraulic working machine according to above item (1) or (2), the second setting pressure of the second swinging relief valve is preferably any value ranging between a relief starting pressure of the shockless function of the first swinging relief valve and the first setting pressure thereof.

This, in the second relief mode, reduces the driving pressure or braking pressure of the hydraulic swing motor, implementing the shockless function.

(4) The hydraulic drive system for a hydraulic working machine according to any one of above items (1) to (3) further comprises an independent relief valve block including the second swinging relief valve, wherein: the swing motor unit includes a port surface at which ports of one pair of actuator hydraulic lines connected to the hydraulic swing motor are opened; and the relief valve block is mounted on the port surface of the swing motor unit and integrated with the motor unit.

This reduces the number of changes from the prior-art swing motor unit, thus enabling reduction in manufacturing costs.

(5) The hydraulic drive system for a hydraulic working machine according to any one of above items (1) to (3) further includes an independent relief valve block including the second swinging relief valve, wherein: the control valve includes a port surface at which ports of one pair of actuator hydraulic lines connected to the swing-directional control valve are opened; and the relief valve block is mounted on the port surface of the control valve and integrated with the control valve.

Thus, even if a space around the swing motor unit is too narrow for the relief valve block to be mounted on the swing motor unit, the relief valve block can be integrated with the control valve by mounting the former on the latter to minimize hydraulic line length for more compact on-vehicle mounting of the hydraulic drive system.

(6) In the hydraulic drive system for a hydraulic working machine according to any one of above items (1) to (3), the selector preferably includes a changeover valve disposed at an upstream side of the second swinging relief valve, and selects either one of the first relief mode and the second relief mode by selectively switching the changeover valve to either one of a communicating position and an interrupting position.

This enables the selector to be constructed using an ordinary inexpensive relief valve as the second swinging relief valve.

(7) In the hydraulic drive system for a hydraulic working machine according to any one of above items (1) to (3), the selector preferably includes a solenoid provided on the second swinging relief valve in order to render the setting pressure of the second swinging relief valve changeable to the first setting pressure and the second setting pressure, the selector selecting either one of the first relief mode and the second relief mode by controlling an electric current flowing through the solenoid.

This makes the changeover valve unnecessary, reducing the number of parts.

In addition, it becomes possible to set at least three different relief pressures, implement the shockless function, and expand a control range.

Effects of the Invention

According to the present invention, without adopting a mechanically complex swing motor relief valve, to easily change the driving pressure or braking pressure of the hydraulic swing motor while maintaining intact a structure of the swinging relief valve having the shockless function, and hence to change the maximum driving torque or braking torque of the hydraulic swing motor can be realized.

MODE FOR CARRYING OUT THE INVENTION

Hereunder, embodiments of the present invention will be described using the accompanying drawings.

First Embodiment

Figure 1:
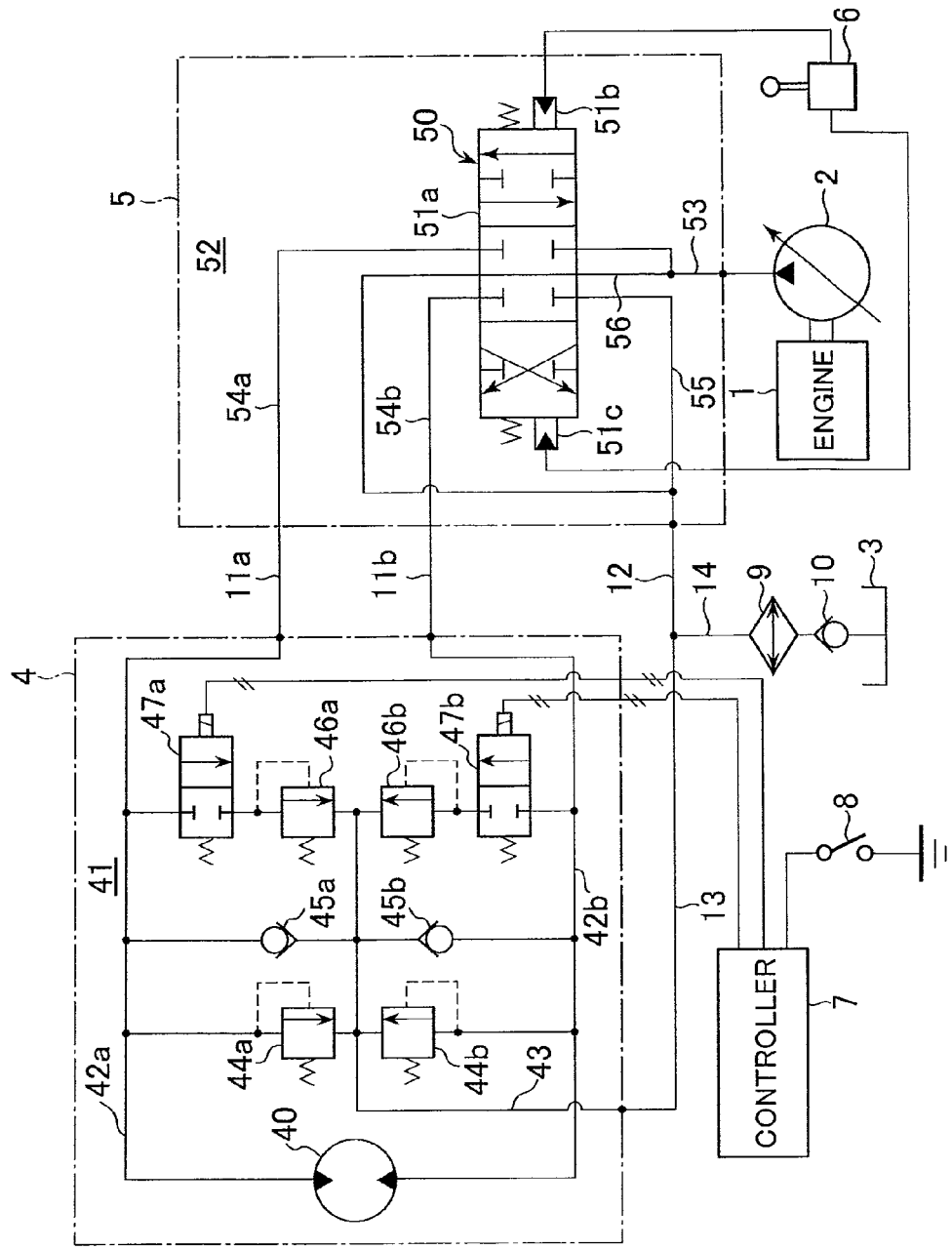
FIG. 1 is a diagram showing a hydraulic drive system for a hydraulic working machine according to a first embodiment of the present invention.

FIG. 1 is a diagram showing a hydraulic drive system for a hydraulic working machine according to a first embodiment of the present invention.

The hydraulic drive system includes: a diesel engine 1 that is a motor; a variable displacement hydraulic pump 2 driven by the engine 1, a hydraulic operating fluid tank 3; a swing motor unit 4 driven by a hydraulic fluid supplied from the hydraulic pump 2, the motor unit 4 including a hydraulic swing motor 40 which rotationally drives a swing structure 101 (see FIG. 2); a control valve 5 having a plurality of directional control valves including a swing-directional control valve 50 for controlling flow of the hydraulic fluid supplied from the hydraulic pump 2 to the hydraulic swing motor 40; a control lever device 6 that instructs the swing structure 101 to operate; a controller 7; a relief pressure change instructing switch 8; an oil cooler 9; and a back-pressure valve 10.

The control valve 5 includes a valve housing 52, with a main spool 51*a* of the swing-directional control valve 50 being disposed inside the valve housing 52. Across the main spool 51*a*, pressure acceptors 51*b*, 51*c* are provided, to one of which is guided a control pilot pressure from the control lever device 6, the control pilot pressure being used for switching operations on the swing-directional control valve. A pump hydraulic line 53, one pair of actuator hydraulic lines 54*a*, 54*b*, and an internal discharge hydraulic line 55 are formed inside the housing 52. When the main spool 51*a* of the swing-directional control valve 50 is switched from a neutral position in FIG. 1 to either one of left and right positions shown therein, the hydraulic fluid from the hydraulic pump 2 is supplied to the swing motor unit 4 via the pump hydraulic line 53, the swing-directional control valve 50, and either one of the paired actuator hydraulic lines 54*a*, 54*b* (e.g., the actuator hydraulic line 54*a*), in that order. A return fluid from the swing motor unit 4 is returned to the tank 3 via the other of the paired actuator hydraulic lines 54*a*, 54*b* (e.g., the actuator hydraulic line 54*b*), the swing-directional control valve 50, and the internal discharge hydraulic line 55, in that order.

The swing-directional control valve 50 is a center-bypass type of valve disposed in a center-bypass hydraulic line 56, and the swing-directional control valve 50 is connected at its upstream side (upstream of the center-bypass hydraulic line 56) to the pump hydraulic line 53. The swing-directional control valve 50 is connected at its downstream side) (downstream of the center-bypass hydraulic line 56) to the internal discharge hydraulic line 55. When the main spool 51*a* is in the neutral position shown in FIG. 1, the swing-directional control valve 50 opens the center-bypass hydraulic line 56 and returns a whole quantity of discharge fluid within the hydraulic pump 2 to the tank 3 via the internal discharge hydraulic line 55. When the main spool 51*a* is switched from the neutral position in FIG. 1 to either one of the left and right positions shown therein, the internal pressure (delivery pressure from hydraulic pump) of the pump hydraulic line 53 is increased by restricting the flow of the fluid within the center-bypass hydraulic line 56 according to a particular stroke of the switching, and uses the increase in pressure to supply the delivery fluid within the hydraulic pump 2 to the swing motor unit 4 via the swing-directional control valve 50. When the swing-directional control valve 50 is switched at its full stroke, the center-bypass hydraulic line 56 is completely closed and the entire quantity of discharge fluid within the hydraulic pump 2 is supplied to the swing motor unit 4.

The other directional control valves of the control valve 5 that are not shown are also constructed similarly, and as known, these directional control valves are arranged in series in the center-bypass hydraulic line 56.

The swing motor unit 4 includes a motor housing 41, with a swash plate, piston, and other constituent elements of the hydraulic swing motor 40 being arranged inside the housing 41. Inside the housing 41 are also formed one pair of actuator hydraulic lines 42*a*, 42*b* and an internal discharge hydraulic line 43, and are arranged one pair of first swing relief valves 44*a*, 44*b* with a shockless function, one pair of check valves 45*a*, 45*b* for make-up supply, one pair of second swing relief valves 46*a*, 46*b* without a shockless function, and one pair of solenoid-operated changeover valves 47*a*, 47*b*.

The paired first swing relief valves 44*a*, 44*b* are connected at respective upstream ends to the paired actuator hydraulic lines 42*a*, 42*b*, respectively, and at respective downstream ends (discharge ends) to the internal discharge hydraulic line 43. The internal discharge hydraulic line 43 is positioned downstream of the first swing relief valves 44*a*, 44*b* to accept the discharge fluid flowing out from the first swing relief valves 44*a*, 44*b*. The paired first swing relief valves 44*a*, 44*b* have a function that limits an internal pressure of the actuator hydraulic lines 42*a*, 42*b* to prevent this internal pressure from exceeding a first setting pressure.

The internal pressure of the actuator hydraulic lines 42*a*, 42*b* that is limited here by the first swing relief valves 44*a*, 44*b* is either a driving pressure developed during, for example, a start of the swing structure 101 (see FIG. 2) when the hydraulic swing motor 40, actuated by the hydraulic fluid supplied from the hydraulic pump 2, drives the swing structure 101, or a braking pressure developed during, for example, a slowdown or stop of the swing structure 101 when the hydraulic swing motor 40 is inertially driven by the swing structure 101 and the hydraulic swing motor 40 applies a braking back pressure to the discharge-side actuator hydraulic line 42*a* or 42*b* by a pumping action.

The paired make-up check valves 45*a*, 45*b* are connected at respective upstream ends to the paired actuator hydraulic lines 42*a*, 42*b*, respectively, and at respective downstream ends to the internal discharge hydraulic line 43. During, for example, the stop of the swing structure 101 when the hydraulic swing motor 40 is inertially driven by the swing structure 101 and the hydraulic swing motor 40 attempts applying a negative pressure to the intake-side actuator hydraulic line 42*a* or 42*b* by a pumping action, the make-up check valves 45*a*, 45*b* prevent cavitation from occurring, by supplying a make-up hydraulic fluid from the internal discharge hydraulic line 43, located downstream of the first swing relief valves 44*a*, 44*b*, to the actuator hydraulic line 42*a* or 42*b*.

The paired second swing relief valves 46*a*, 46*b*, as with the paired first swing relief valves 44*a*, 44*b*, are connected at respective upstream ends to the paired actuator hydraulic lines 42*a*, 42*b*, respectively, and at respective downstream ends (discharge ends) to the internal discharge hydraulic line 43. In other words, the paired second swing relief valves 46*a*, 46*b* are connected to the paired actuator hydraulic lines 42*a*, 42*b* in parallel with respect to the paired first swing relief valves 44*a*, 44*b*, and the downstream ends of the paired second swing relief valves 46*a*, 46*b* are connected to the internal discharge hydraulic line 43, at the downstream ends of the first swing relief valves 44*a*, 44*b*, to ensure that the discharge fluids within the second swing relief valves 46*a*, 46*b* join the discharge fluids within the first swing relief valves 44*a*, 44*b*, at positions that neighbor downstream sections of the paired first swing relief valves 44*a*, 44*b*. The paired second swing relief valves 46*a*, 46*b* have a function that limits the internal pressure of the actuator hydraulic lines 42*a*, 42*b* (i.e., the driving pressure or braking pressure of the hydraulic swing motor 40) to prevent the pressure from exceeding a second setting pressure lower than the first setting pressure.

The one pair of solenoid-operated changeover valves 47*a*, 47*b* are arranged upstream of the paired second swing relief valves 46*a*, 46*b*, respectively. The one pair of solenoid-operated changeover valves 47*a*, 47*b*, when in a closing position shown in FIG. 1, interrupt communication between the paired actuator hydraulic lines 42*a*, 42*b* and the paired second swing relief valves 46*a*, 46*b*, and make the function of these relief valves 46a, 46b inoperative. At the time, the paired first swing relief valves 44a, 44b function independently and relief characteristics of the first swing relief valves remain operative intact. When the one pair of solenoid-operated changeover valves 47a, 47b are switched from the closing position shown in FIG. 1 to an opening position, these valves re-establish the communication between the paired actuator hydraulic lines 42a, 42b and the paired second swing relief valves 46a, 46b, and make the function of these relief valves 46a, 46b operative. At the time, the paired first swing relief valves 44a, 44b and the paired second swing relief valves 46a, 46b function in combined form and the relief characteristics of the first swing relief valves 44a, 44b are combined with those of the second swing relief valves 46a, 46b. Thus, the first setting pressure P1 of the first swing relief valves 44a, 44b that corresponds to the relief characteristics thereof is reduced to the second setting pressure P2 of the second swing relief valves 46a, 46b, to provide new relief characteristics (described later herein).

By switching the opening and closing of the one pair of solenoid-operated changeover valves 47a, 47b in this way, either one of a first relief mode in which the paired first swing relief valves 44a, 44b function independently, and a second relief mode in which the paired first swing relief valves 44a, 44b and the paired second swing relief valves 46a, 46b function in combined form can be selected.

The paired actuator hydraulic lines 54a, 54b in the control valve 5 are respectively connected to the paired actuator hydraulic lines 42a, 42b in the swing motor unit 4 via one pair of actuator lines 11a, 11b. The internal discharge hydraulic line 55 in the control valve 5 is connected to a first discharge line 12, the internal discharge hydraulic line 43 in the swing motor unit 4 is connected to a second discharge line 13, and the first and second discharge lines 12, 13 are connected to the tank 3 via a common third discharge line 14. The oil cooler 9 and the back-pressure valve 10 are arranged in the third discharge line 14.

The solenoid-operated changeover valves 47a, 47b have their opening/closing positions changed by a signal sent from the controller 7. The controller 7 receives an instruction signal from the relief pressure change instructing switch 8, and if the instruction signal indicates a change of the relief pressure, the controller 7 outputs a switching signal to the solenoid-operated changeover valves 47a, 47b.

The controller 7, the relief pressure change instructing switch 8, and the solenoid-operated changeover valves 47a, 47b constitute the selector either one of the first relief mode in which to make the relief characteristics of the first swing relief valves 44a, 44b operative intact, and the second relief mode in which to provide the relief characteristics obtained by reducing the first setting pressure of the relief characteristics of the first swinging relief valve to the second setting pressure of the second swinging relief valve 46a, 46b.

Figure 2:
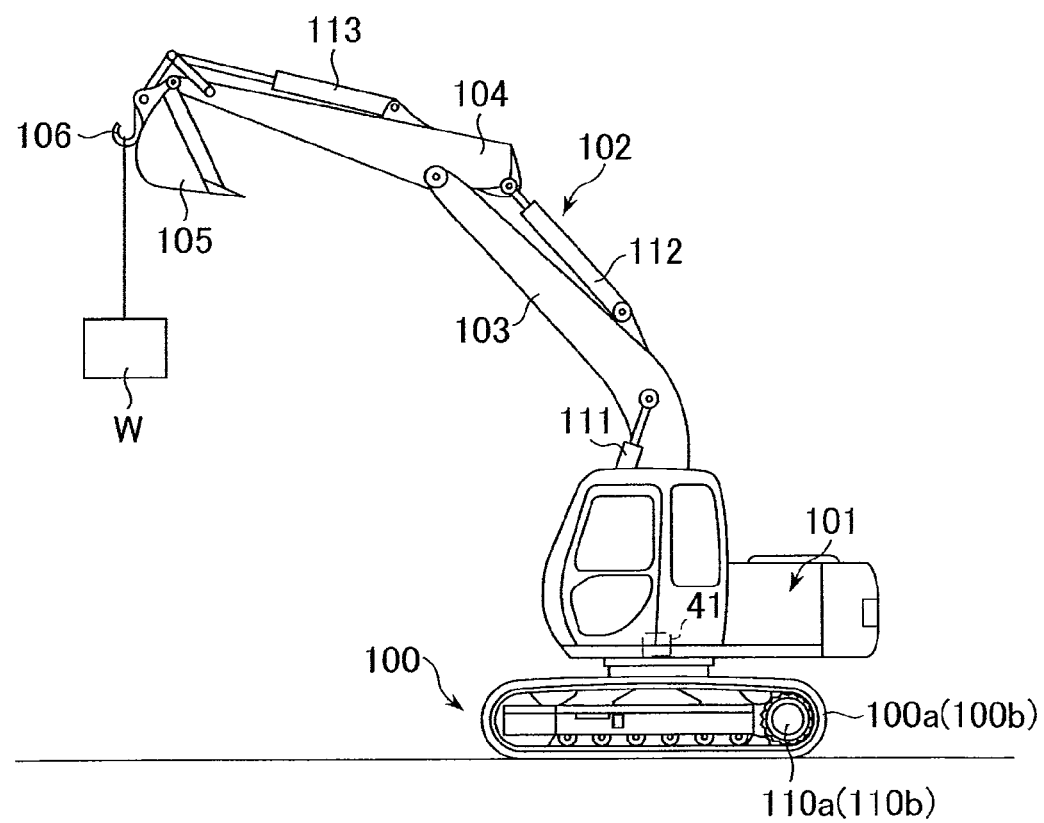
FIG. 2 is an external view of a hydraulic excavator which is an example of a hydraulic working machine having the hydraulic drive system of the first embodiment of the present invention mounted therein.

FIG. 2 is an external view of a hydraulic excavator which is an example of a hydraulic working machine having the hydraulic drive system shown in FIG. 1.

The hydraulic excavator includes a track structure 100, a swing structure 101, and a front work implement 102, the track structure 100 travels by driving its left and right crawlers 100a, 100b (one only of the crawlers is shown) by means of track motors 110a, 110b (one only of the motors is shown), and the swing structure 101 swings above the track structure 100 by means of the hydraulic swing motor 40. In addition, the front work implement 102 is an articulated structure including a boom 103, an arm 104, and a bucket 105, each of which is rotationally driven in a perpendicular plane by a boom cylinder 111, an arm cylinder 112, or a bucket cylinder 113, respectively. The bucket 105, provided with a lifting hook 106, can conduct load-lifting work by having a load W hung from the lifting hook 106.

The driving of the left track motor 110a is controlled by a traveling leftward-directional control valve, the driving of the right track motor 110b is controlled by a traveling rightward-directional control valve, the driving of the hydraulic swing motor 40 is controlled by the swing-directional control valve 50, the driving of the boom cylinder 111 is controlled by a boom directional control valve, the driving of the arm cylinder 112 is controlled by an arm directional control valve, and the driving of the bucket cylinder 113 is controlled by a bucket directional control valve. Directional control valves other than the swing-directional control valve 50 are omitted in FIG. 1.

Figure 3:
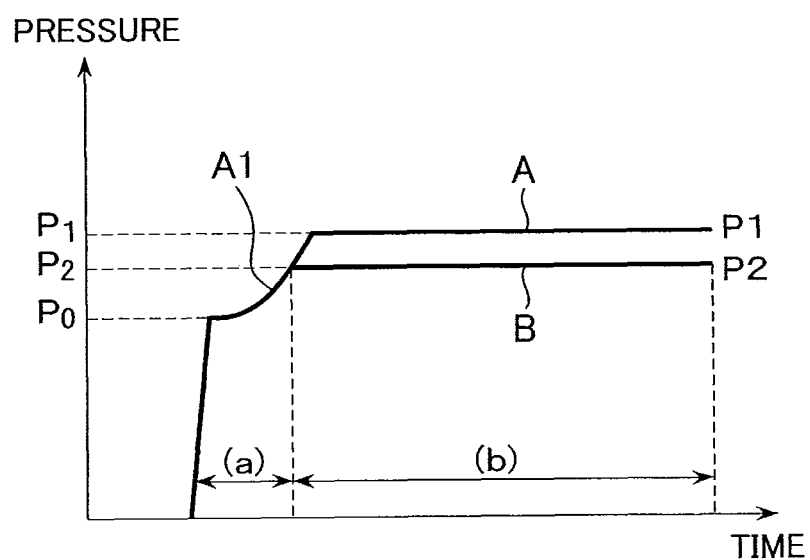
FIG. 3 is a diagram that shows relief pressure characteristics of the hydraulic drive system according to the first embodiment of the present invention.

FIG. 3 is a diagram that shows how the relief pressure of the actuator hydraulic lines 42a, 42b changes when the internal pressure increases. A horizontal axis denotes time, and a vertical axis denotes a swinging relief pressure. Reference symbol A denotes the relief characteristics of the first swing relief valves 44a, 44b, and reference symbol B denotes the relief characteristics of the second swing relief valves 46a, 46b. Reference symbol P1 denotes the first setting pressure of the relief characteristics A of the first swing relief valves 44a, 44b, and reference symbol P2 denotes the second setting pressure of the relief characteristics B of the second swing relief valves 46a, 46b. Reference symbol A1 denotes characteristics of the shockless function of the first swing relief valves 44a, 44b, and reference symbol P0 denotes a relief starting pressure of the first swing relief valves 44a, 44b in the shockless function thereof.

The shockless function refers to a function that as denoted by A1 in the relief characteristics A of the first swing relief valves 44a, 44b, starts the opening of the valve at pressure P0 intentionally reduced below the setting pressure P1, and reduces any impacts of an increase in internal pressure due to an abrupt increase in driving pressure or braking pressure.

The second setting pressure P2 of the second swing relief valves 46a, 46b is set to be any value ranging between the relief starting pressure P0 of the shockless function of the first swing relief valves 44a, 44b and the first setting pressure P1 thereof. The first setting pressure P1 of the first swing relief valves 44a, 44b is, for example, 30 MPa, the relief starting pressure P0 of the shockless function of the first swing relief valves 44a, 44b is, for example, 20 MPa, and the second setting pressure P2 of the second swing relief valves 46a, 46b is, for example, 26 MPa.

If the instruction signal from the relief pressure change instructing switch 8 does not specify a change of the relief pressure, the solenoid-operated changeover valves 47a, 47b are in the closing position shown in FIG. 1, and the first relief mode in which the first swing relief valves 44a, 44b independently function is selected. In the first relief mode, the relief characteristics of the first swing relief valves 44a, 44b are operative as they are, and the relief pressure of the actuator hydraulic line 42a or 42b during the increase in the internal pressure changes as denoted by characteristics curve A. In this characteristics pattern, if the pressure in the actuator hydraulic line 42a or 42b exceeds P0, the shockless function is obtained at characteristics curve A1.

If the instruction signal from the relief pressure change instructing switch 8 indicates a change of the relief pressure, the controller 7 outputs a command signal to the solenoid-operated changeover valves 47a, 47b, thus switching the solenoid-operated changeover valves 47a, 47b from the closing position to the opening position, and opening the hydraulic fluid passageways leading to the second swing relief valves 46a, 46b. At this time, the second relief mode in which the first swing relief valves 44a, 44b and the second swing relief valves 46a, 46b function in combined form is selected and the relief pressure of the actuator hydraulic line 42a or 42b during the increase in the internal pressure changes as denoted by characteristics curve B. That is to say, the relief characteristics of the first swing relief valves 44a, 44b and those of the second swing relief valves 46a, 46b become combined, whereby relief characteristics are obtained as a result of reducing the first setting pressure P1 of the relief characteristics of the first swing relief valves 44a, 44b to the second setting pressure P2 of the second swing relief valves 46a, 46b.

In the second relief mode, the first swing relief valves 44a, 44b and the second swing relief valves 46a, 46b combinedly function and as a result, in a time zone of (a), the relief pressure is controlled to a pressure determined by the shockless mechanism A1 of the first swing relief valves 44a, 44b, and in a time zone of (b), the relief pressure is controlled to the second setting pressure P2 determined by the second swing relief valves 46a, 46b.

The hydraulic fluid, after being relieved by the first swinging relief valve 44a or 44b and the second swinging relief valve 46b or 46b, flows through the internal discharge hydraulic line 43 within the swing motor unit 4, then flows through the discharge lines 13, 14 outside the swing motor unit 4, and after joining the return fluid within the directional control valve 51, returns to the hydraulic operating fluid tank 3 through the oil cooler 9 and the back-pressure valve 10.

In the present embodiment having the above configuration, when the first relief mode is selected by the operation of the relief pressure change instructing switch 8, the relief characteristics of the first swing relief valves 44a, 44b remain operative intact and the shockless function thereof is obtained. The relief characteristics obtained when the second relief mode is selected by the operation of the relief pressure change instructing switch 8 will be those resulting from reducing the first setting pressure P1 of the relief characteristics of the first swing relief valves 44a, 44b to the second setting pressure P2 of the second swing relief valves 46a, 46b.

In the first relief mode, therefore, as with the prior-art relief valve having a shockless function, the valve mechanism in the present embodiment relieves the starting or stopping shock that the swing structure generates. In the second relief mode, since the second setting pressure P2 of the second swing relief valves 46a, 46b is set to a value between the relief starting pressure P0 and first setting pressure P1 of the first swing relief valves 44a, 44b, this reduces the driving pressure or braking pressure of the hydraulic swing motor 40 and provides the shockless function. This reduces the maximum driving torque or braking torque of the hydraulic swing motor 40 and makes the shockless function relieve the shock applied during the start or stop of swinging for the shockless function.

Hence, the first swing relief valves 44a, 44b with the shockless function can maintain their structure intact, easily change the driving pressure or braking pressure of the hydraulic swing motor 40, and hence, change the maximum driving torque or braking torque of the hydraulic swing motor 40.

In addition, since the downstream ends of the second swing relief valves 46a, 46b are connected to the internal discharge hydraulic line 43, the discharge fluids within the second swing relief valves 46a, 46b join the discharge fluids within the first swing relief valves 44a, 44b, at the positions that neighbor the downstream sections of the first swing relief valves 44a, 44b. Thus, during hydraulic fluid replenishing by the make-up check valves 45a, 45b, the discharge fluids within the second swing relief valves 46a, 46b join the discharge fluids within the first swing relief valves 44a, 44b, to form one flow of hydraulic fluid supplied to the make-up check valves 45a, 45b. This ensures more reliable replenishing of the hydraulic fluid by the make-up check valves 45a, 45b during the pumping action of the hydraulic swing motor 40, thereby suppressing the occurrence of cavitation in the hydraulic swing motor 40 and the actuator hydraulic lines 42a, 42b.

Next, applications of the present embodiment will be described.

1. Application to a Load-Lifting Mode (Crane Mode)

One of operations which the hydraulic excavator conducts is load-lifting work (crane work), which as shown in FIG. 2, is the work of moving the load W hung from the lifting hook 106 on the bucket 105. To perform the load-lifting work, an operator selects a load-lifting mode by setting a load-lifting mode selector switch to an ON position, then reduces a rotational speed of the engine 1 to suppress operation of the hydraulic swing motor 40 and other actuators to a low speed, and thus suppresses occurrence of vibration of the load (i.e., load vibration) during lifting.

For application of the present embodiment to the load-lifting mode, the first relief mode is used as normal mode, and the second relief mode is used as the load-lifting mode. Additionally, the first setting pressure P1 of the first swing relief valves 44a, 44b is defined as a pressure (e.g., the 30-MPa pressure mentioned above) suitable for normal work, and the second setting pressure P2 of the second swing relief valves 46a, 46b is defined as a pressure (e.g., the 26-MPa pressure mentioned above) suitable for the load-lifting mode.

For the normal work, the relief pressure change instructing switch 8 is set to an OFF position and the first relief mode is selected. At this time, the solenoid-operated changeover valves 47a, 47b are in the closing position shown in FIG. 1, the paired first swing relief valves 44a, 44b function independently, and the relief pressure of the actuator hydraulic line 42a or 42b during the increase in the internal pressure changes as denoted by characteristics curve A. In this characteristics pattern, if the pressure in the actuator hydraulic line 42a or 42b exceeds P0, the shockless function is obtained at characteristics curve A1, thereby relieving the shock applied during the start or stop of swinging.

For the load-lifting work, the setting position of the relief pressure change instructing switch 8 is changed to the ON position and the second relief mode is selected. At this time, the solenoid-operated changeover valves 47a, 47b are switched from the closing position to the opening position, the first swing relief valves 44a, 44b and the second swing relief valves 46a, 46b combinedly function, and the relief pressure of the actuator hydraulic line 42a or 42b during the increase in the internal pressure changes as denoted by characteristics curve B. That is to say, a relief characteristics are obtained as a result of reducing the first setting pressure P1 of the relief characteristics of the first swing relief valves 44a, 44b to the second setting pressure P2 of the second swing relief valves 46a, 46b. In this characteristics pattern, if the pressure in the actuator hydraulic line 42a or 42b exceeds P0, the shockless function is obtained at characteristics curve A1. Additionally, since the driving pressure of the hydraulic swing motor 40 decreases from P1 to P2, the maximum driving torque or braking torque of the motor also decreases. This, in turn, causes the shockless function to relieve the shock applied during the start or stop of swinging, reduces swinging acceleration or deceleration with the decrease in the maximum driving torque or braking torque of the hydraulic swing motor 40, and enables the load-lifting work to be performed with minimal load vibration.

The relief pressure change instructing switch 8 may be provided independently of the mode selector switch used to select the load-lifting mode, or may also function as a mode selector switch used to select modes including the load-lifting mode.

2. Application to a Front Attachment Change

In addition to having the bucket 105 shown as a front attachment in FIG. 2, the hydraulic excavator can have the bucket changed for any other attachment, and thus conduct various kinds of work other than the normal work. For example, changing the bucket 105 to a crusher enables the excavator to conduct crushing work at a dismantling worksite. By the way, compared to the weight of the bucket 105 and other attachments, the other attachments more often than heavy the bucket 105. When the type of attachment to be used is the bucket, the pressure of the swing relief valves is usually set to be a value suitable for the swing-driving and swinging of the swing structure. After the change for an attachment other than the bucket, therefore, since the swing structure increases in swing load, if the setting pressure of the swinging relief valve is left as it is, the driving pressure or braking pressure of the hydraulic swing motor 40 may be too low. Sluggish swinging may result if the driving pressure or the braking pressure is too low.

For the application of the present embodiment to the change for a front attachment, the second relief mode is used if the attachment is the bucket 105, and the first relief mode is used if the attachment is other than the bucket. In addition, the second setting pressure P2 of the second swing relief valves 46a, 46b is defined as a value (e.g., 30 MPa) suitable for a case in which the front attachment is the bucket 105, and the first setting pressure P1 of the first swing relief valves 44a, 44b is defined as a value (e.g., 32 MPa) suitable for a case in which the attachment is other than the bucket (e.g., crusher).

If the bucket 105 is to be used as the attachment, the setting position of the relief pressure change instructing switch 8 is changed to the ON position and the second relief mode is selected. This makes the first swing relief valves 44a, 44b and the second swing relief valves 46a, 46b combinedly function, and provides the relief characteristics B obtained as the result of reducing the first setting pressure P1 of the relief characteristics A of the first swing relief valves 44a, 44b to the second setting pressure P2 of the second swing relief valves 46a, 46b. In this characteristics pattern, the shockless function is obtained and since the pressure P2 suitable for using the bucket 105 as a front attachment is obtained as the driving pressure of the hydraulic swing motor 40, the starting or stopping shock of the swinging operations is relieved. In addition, optimal swinging acceleration or deceleration for the case where the attachment is the bucket 105 is obtained and high-operability swinging is implemented.

If an attachment other than the bucket 105, for example, a crusher is to be used, the relief pressure change instructing switch 8 is set to the OFF position and the first relief mode is selected. This makes the paired first swing relief valves 44a, 44b function independently and the relief characteristics A are obtained. In this characteristics pattern, the shockless function is obtained and since the pressure P1 suitable for using the crusher as a front attachment is obtained as the driving pressure of the hydraulic swing motor 40, the starting or stopping shock of the swinging operations is relieved. In addition, optimal swinging acceleration or deceleration for the case where the attachment is the crusher is obtained. Furthermore, high-operability swinging is also implemented in this case.

3. Application to Control that Requires a Swing-Driving Torque Change

There may arise a case, although not shown, that the swing-driving torque (or swing-braking torque) needs changing in operative association with some kind of control. In that case, instead of the relief pressure change instructing switch 8, an appropriate control section for conducting the control may be provided to specify a relief pressure change using a control signal sent from the control section, and change the setting of the swinging relief pressure. Thus, the swing-driving torque or the swing-braking torque will be switched synchronously with the control, and improved swinging operability and other beneficial effects will be obtained.

Second Embodiment

Figure 4:
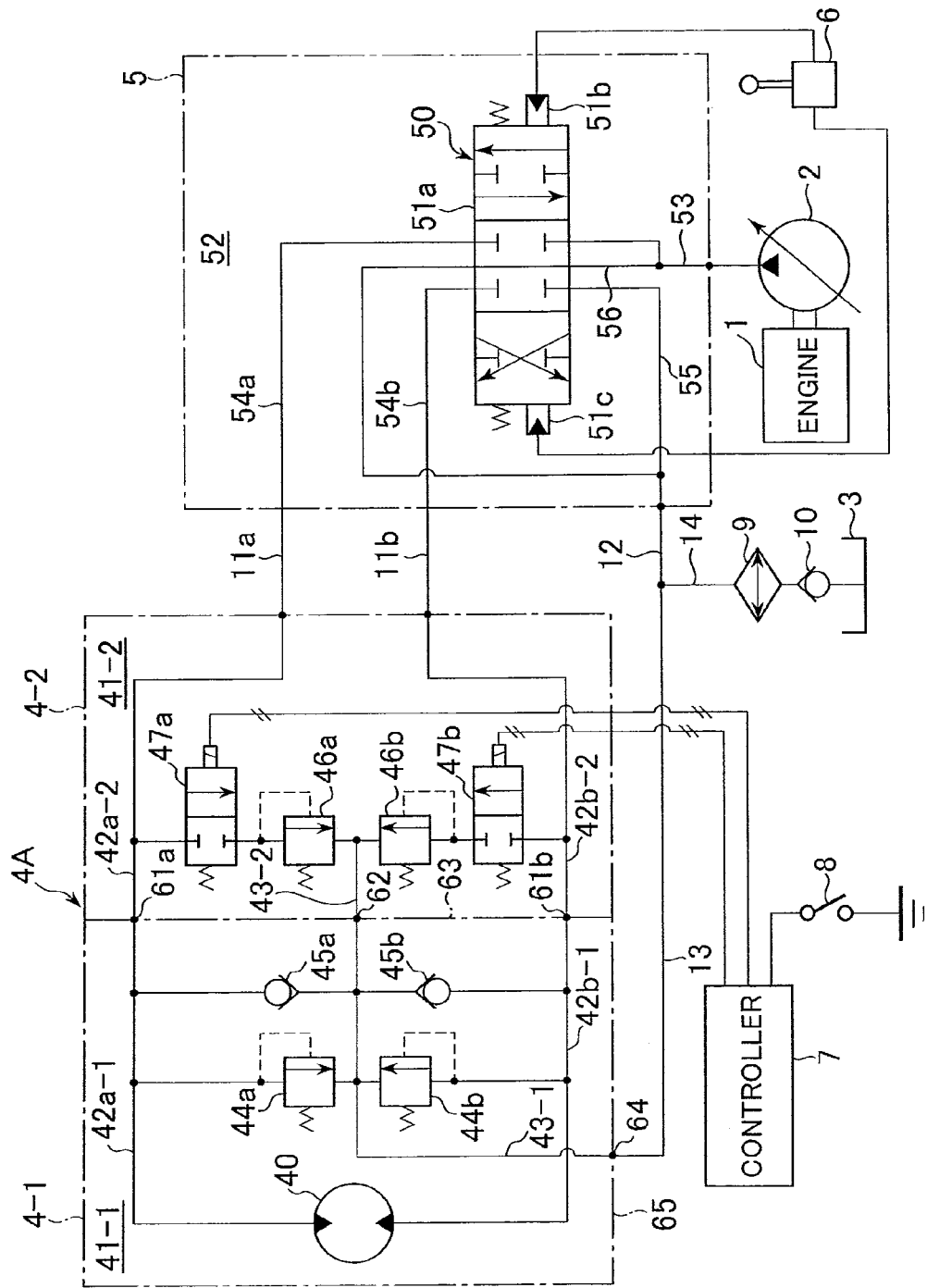
FIG. 4 is a diagram showing a hydraulic drive system for a hydraulic working machine according to a second embodiment of the present invention.

FIG. 4 is a diagram showing a hydraulic drive system for a hydraulic working machine according to a second embodiment of the present invention. In the figure, the same reference numbers are assigned to members equivalent to those shown in FIG. 1.

Referring to FIG. 4, a swing motor unit 4A is constituted primarily by a swing motor section 4-1 and an additional relief valve section 4-2.

The swing motor section 4-1 includes the hydraulic swing motor 40 in a housing 41-1, in the housing of which are also formed one pair of actuator hydraulic lines 42a-1, 42b-1 and an internal discharge hydraulic line 43-1. In addition, the paired first swing relief valves 44a, 44b, each with the shockless function, and the paired make-up check valves 45a, 45b are arranged.

Furthermore, the housing 41-1 includes a first port surface 63 at which ports 61a, 61b of the paired actuator hydraulic lines 42a-1, 42b-1 and a port 62 at one end of the internal discharge hydraulic line 43-1 are opened, and a second port surface 65 at which a port 64 at the other end of the internal discharge hydraulic line 43-1 is opened. The internal discharge hydraulic line 43-1 is connected to the second discharge line 13 via the port 64.

The additional relief valve section 4-2 is constructed as a relief valve block that includes a housing 41-2 independent of the housing 41-1 of the swing motor section 4-1. The additional relief valve section 4-2 is hereinafter referred to as the relief valve block. The housing 41-2 is mounted on the first port surface 63 of the housing 41-1 of the swing motor section 4-1 by bolting or the like, such that the relief valve block 4-2 is integrated with the swing motor section 4-1.

Inside the housing 41-2 of the relief valve block 4-2, one pair of actuator hydraulic lines 42a-2, 42b-2 and an internal discharge hydraulic line 43-2 are formed and the paired second swing relief valves 46a, 46b, neither having the shockless function, and the solenoid-operated changeover valves 47a, 47b are arranged.

Communication of the actuator hydraulic lines 42a-2, 42b-2 of the relief valve block 4-2 with respect to the actuator hydraulic lines 42a-1, 42b-1 of the swing motor section 4-1 is established with the swing motor section 4-1 and the relief valve block 4-2 integrated with each other. Communication between the internal discharge hydraulic line 43-2 and the internal discharge hydraulic line 43-1 is likewise established with the swing motor section 4-1 and the relief valve block 4-2 integrated. The actuator hydraulic lines 42a-2, 42b-2 of the relief valve block 4-2 are connected to the paired actuator hydraulic lines 54a, 54b of the control valve 5 via the paired actuator lines 11a, 11b.

The present embodiment yields substantially the same advantageous effects as obtained in the first embodiment.

In the first embodiment, since the second swing relief valves 46a, 46b and the solenoid-operated changeover valves 47a, 47b are integrated, the swing motor unit 4 includes a large number of changes from the prior-art swing motor unit.

In the second embodiment, however, since the relief valve block 4-2 is combined into the swing motor section 4-1 constructed only with the ports of the internal discharge hydraulic line 43-1 remaining opened, the number of changes from the prior-art swing motor unit is reduced and manufacturing costs are correspondingly reduced.

Third Embodiment

Figure 5:
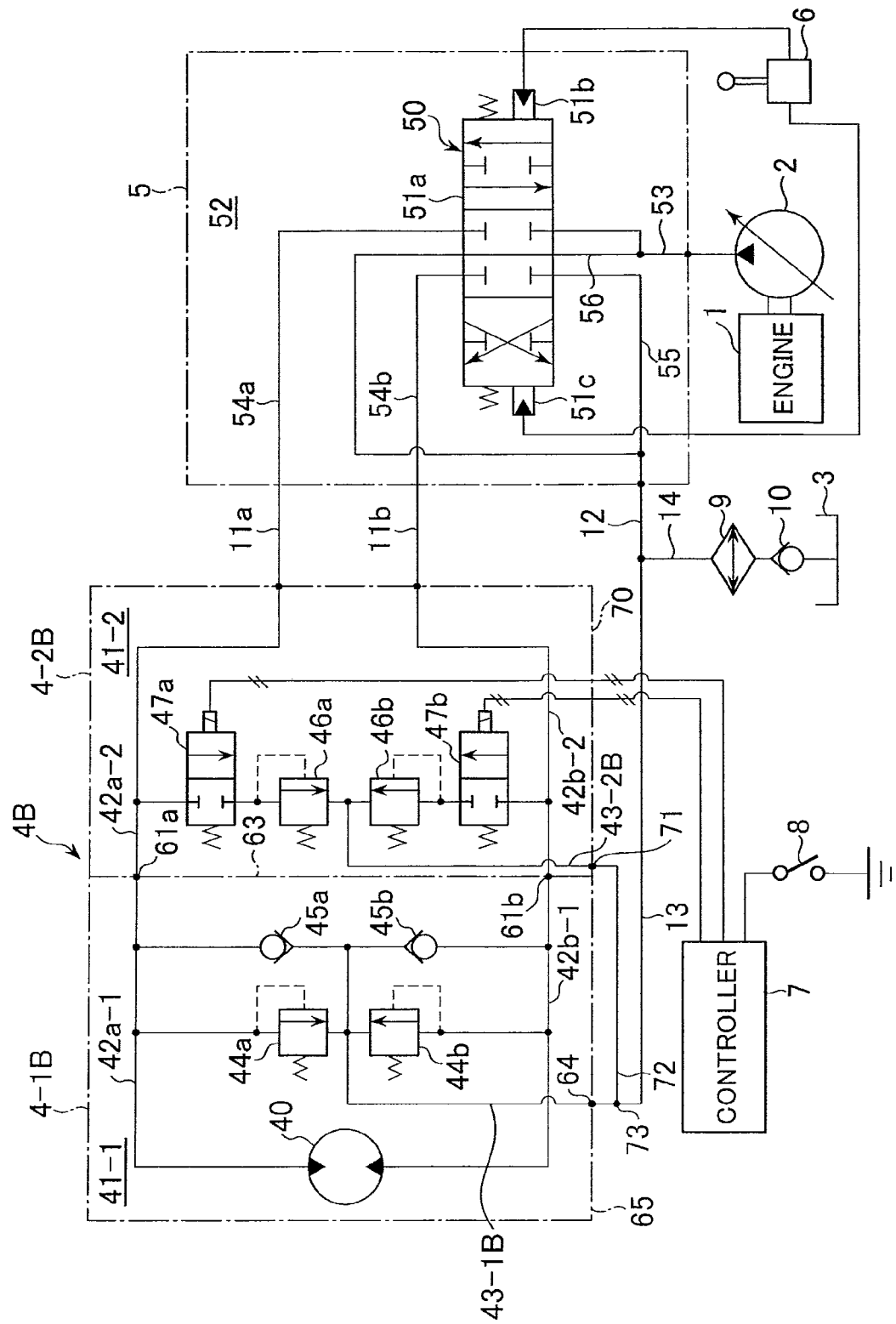
FIG. 5 is a diagram showing a hydraulic drive system for a hydraulic working machine according to a third embodiment of the present invention.

FIG. 5 is a diagram showing a hydraulic drive system for a hydraulic working machine according to a third embodiment of the present invention. In the figure, the same reference numbers are assigned to members equivalent to those shown in FIGS. 1 and 4.

Referring to FIG. 5, the present embodiment is substantially the same as the second embodiment in that a swing motor unit 4B is constituted primarily by a swing motor section 4-1B and an additional relief valve section 4-2B, in that the additional relief valve section 4-2B is constructed as a relief valve block that includes the housing 41-2 independent of the housing 41-1 of the swing motor section 4-1, and in that the housing 41-2 is mounted on a first port surface 63 of a housing 41-1 of the swing motor section 4-1B by bolting or the like, such that the relief valve block 4-2B is integrated with the swing motor section 4-1B.

In the present embodiment, ports of an internal discharge hydraulic line 43-1B are not opened at the first port surface 63 of the housing 41-1 of the swing motor section 4-1B, and the swing motor section 4-1B is constructed substantially the same as the prior-art swing motor unit.

The relief valve block 4-2B includes an internal discharge hydraulic line 43-1B. The internal discharge hydraulic line 43-2B includes a port 71 opened at a third port surface 70 provided on one lateral face of the housing 41-2 of the relief valve block 4-2B, the port 71 being connected to the second discharge line 13 via a fourth discharge line 72, at a position 73 neighboring the second port surface 65 at which a port 64 of the internal discharge hydraulic line 43-1B of the swing motor section 4-1B is opened. The position 73 neighboring the second port surface 65 is, for example, 0 to 20 cm, preferably 0 to 10 cm, away from the second port surface 65. Thus, the downstream ends of the second swing relief valves 46a, 46b are connected to the internal discharge hydraulic line 43-1B so that during hydraulic fluid replenishing by the make-up check valves 45a, 45b, discharge fluids within the second swing relief valves 46a, 46b will flow from the position 73 neighboring a downstream portion of the first swing relief valves 44a, 44b, into the internal discharge hydraulic line 43-1B. The discharge fluids that have thus flown into the internal discharge hydraulic line 43-1B will join discharge fluids within the first swing relief valves 44a, 44b, thus forming one flow of hydraulic fluid supplied to the make-up check valves 45a, 45b.

In the second embodiment, the relief valve block 4-2 is mounted on the swing motor section 4-1. However, since the internal discharge hydraulic line 43-2 in the relief valve block 4-2 is made to communicate with the internal discharge hydraulic line 43-1 of the swing motor section 4-1, at the first port surface 63 of the swing motor section 4-1, ports of the internal discharge hydraulic line 43-1 need to be formed such that in the swing motor section 4-1, the internal discharge hydraulic line 43-1 is opened at the first port surface 63.

In contrast to this, while the present embodiment is the same as the second embodiment in that the relief valve block 4-2B is mounted on the swing motor section 4-1B, the port 71 of the internal discharge hydraulic line 43-2B, located downstream of the second swing relief valves 46a, 46b, is opened at the third port surface 70 of the housing 41-2 of the relief valve block 4-2B, and the port 71 is connected to the second discharge line 13 via the fourth discharge line 72, at the position 73 neighboring a downstream portion of the second port surface 65 of the swing motor section 4-1B. This makes the discharge fluids within the second swing relief valves 46a, 46b join the discharge fluids within the first swing relief valves 44a, 44b, at the position 73 neighboring a downstream portion of the first swing relief valves 44a, 44b.

This construction makes the swing motor section 4-1B have substantially the same configuration as employed in the prior-art swing motor unit. As a result, the number of changes from the prior-art swing motor unit is further reduced and manufacturing costs are correspondingly further reduced.

As described above, the downstream ends of the second swing relief valves 46a, 46b are formed for the discharge fluids within the second swing relief valves 46a, 46b to join the discharge fluids within the first swing relief valves 44a, 44b, at the position 73 neighboring a downstream portion of the first swing relief valves 44a, 44b. During hydraulic fluid replenishing by the make-up check valves 45a, 45b, therefore, the discharge fluids within the second swing relief valves 46a, 46b flow similarly to those described in the above embodiments, that is, the discharge fluids flow from the position 73 neighboring the downstream portion of the first swing relief valves 44a, 44b, into the internal discharge hydraulic line 43-1B. The discharge fluids that have thus flown into the internal discharge hydraulic line 43-1B join the discharge fluids within the first swing relief valves 44a, 44b, thus forming one flow of hydraulic fluid supplied to the make-up check valves 45a, 45b. This, as in the first and second embodiments, ensures more reliable replenishing of the hydraulic fluid by the make-up check valves 45a, 45b during the pumping action of the hydraulic swing motor 40, thereby suppressing the occurrence of cavitation in the actuator hydraulic lines 42a-2, 42b-2.

Fourth Embodiment

Figure 6:
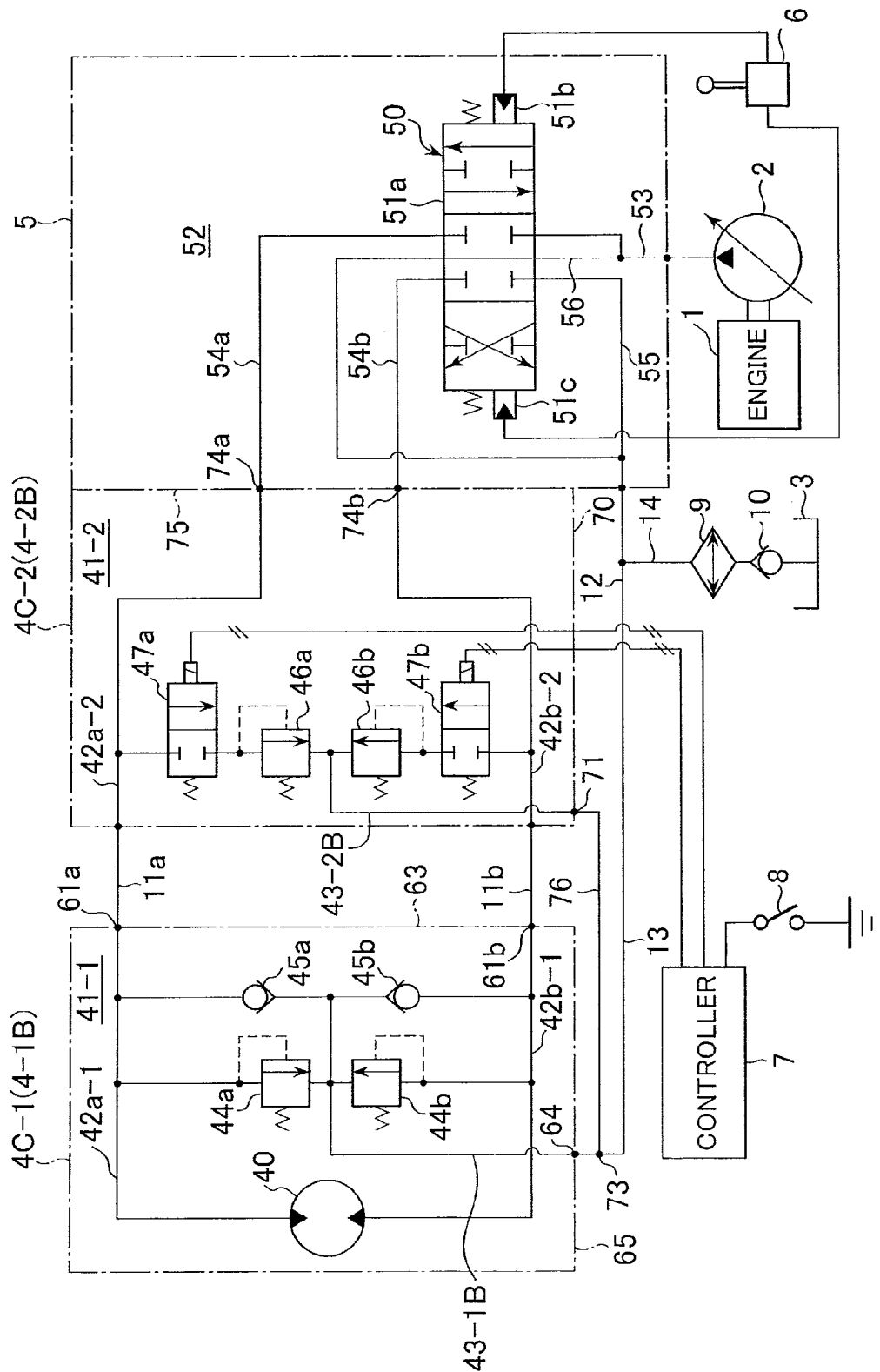
FIG. 6 is a diagram showing a hydraulic drive system for a hydraulic working machine according to a fourth embodiment of the present invention.

FIG. 6 is a diagram showing a hydraulic drive system for a hydraulic working machine according to a fourth embodiment of the present invention. In the figure, the same reference numbers are assigned to members equivalent to those shown in FIGS. 1, 4, and 5.

Referring to FIG. 6, a swing motor unit 4C-1 is formed only from the swing motor section 4-1B included in the third embodiment, and a relief valve block 4C-2 is constituted primarily by an additional relief valve section 4-2B that is independent of the swing motor section 4-1B and separate therefrom.

The valve housing 52 of the control valve 5 includes a fourth port surface 75 at which ports 74a, 74b of the paired actuator hydraulic lines 54a, 54b are opened, and the relief valve block 4C-2 is mounted on the fourth port surface 75 of the control valve 5 by bolting or the like, thereby being integrated with the control valve 5. Communication of the actuator hydraulic lines 42a-2, 42b-2 of the relief valve block 4C-2 with respect to the actuator hydraulic lines 54a, 54b of the control valve 5 is established with the relief valve block 4C-2 and the control valve 5 integrated with each other. The actuator hydraulic lines 42a-2, 42b-2 of the relief valve block 4C-2 are connected to the paired actuator hydraulic lines 42a-1, 42b-1 of the swing motor unit 4C-1 via the paired actuator lines 11a, 11b.

In addition, the internal discharge hydraulic line 43-2B of the relief valve block 4C-2 is connected to the second discharge line 13 via the port 71 and a fifth discharge line 76, at the position 73 neighboring the second port surface 65 at which the port 64 of the internal discharge hydraulic line 43-1B of the swing motor unit 4C-1. Thus, the downstream ends of the second swing relief valves 46a, 46b are connected to the internal discharge hydraulic line 43-1B so that during hydraulic fluid replenishing by the make-up check valves 45a, 45b, the discharge fluids within the second swing relief valves 46a, 46b will flow from the position 73 neighboring a downstream portion of the first swing relief valves 44a, 44b, into the internal discharge hydraulic line 43-1B. The discharge fluids that have thus flown into the internal discharge hydraulic line 43-1B will join the discharge fluids within the first swing relief valves 44a, 44b, thus forming one flow of hydraulic fluid supplied to the make-up check valves 45a, 45b.

In some machine (hydraulic excavator), there is not enough the space around the swing motor unit 4C-1 and may not install the relief valve block 4C-2 in the swing motor unit 4C-1. In such a case, the relief valve block 4C-2 will need to be disposed between the swing motor unit 4C-1 and a control valve 5. This will in turn make it necessary to provide a location for fixing the relief valve block 4C-2, in addition to a location for arranging additional hydraulic lines between the relief valve block 4C-2 and the swing motor unit 4C-1 and between the relief valve block 4C-2 and the control valve 5.

As opposed to this, in the present embodiment, hydraulic line length can be minimized for more compact on-vehicle mounting of the hydraulic drive system by mounting the relief valve block 4C-2 integrally with the control valve 5.

Additionally, in this case, the discharge fluids, after being relieving from the second swing relief valves 46a, 46b of the relief valve block 4C-2, also join the discharge fluids within the first swing relief valves 44a, 44b, at the position 73 neighboring a downstream portion of the first swing relief valves 44a, 44b. As in the first to third embodiments, therefore, during hydraulic fluid replenishing by the make-up check valves 45a, 45b, the discharge fluids within the second swing relief valves 46a, 46b flow from the position 73 neighboring the downstream portion of the first swing relief valves 44a, 44b, into the internal discharge hydraulic line 43-1B. The discharge fluids that have thus flown into the internal discharge hydraulic line 43-1B join the discharge fluids within the first swing relief valves 44a, 44b, thus forming one flow of hydraulic fluid supplied to the make-up check valves 45a, 45b. This ensures more reliable replenishing of the hydraulic fluid by the make-up check valves 45a, 45b during the pumping action of the hydraulic swing motor 40, thereby suppressing the occurrence of cavitation in the actuator hydraulic lines 42a-2, 42b-2.

Fifth Embodiment

Figure 7:
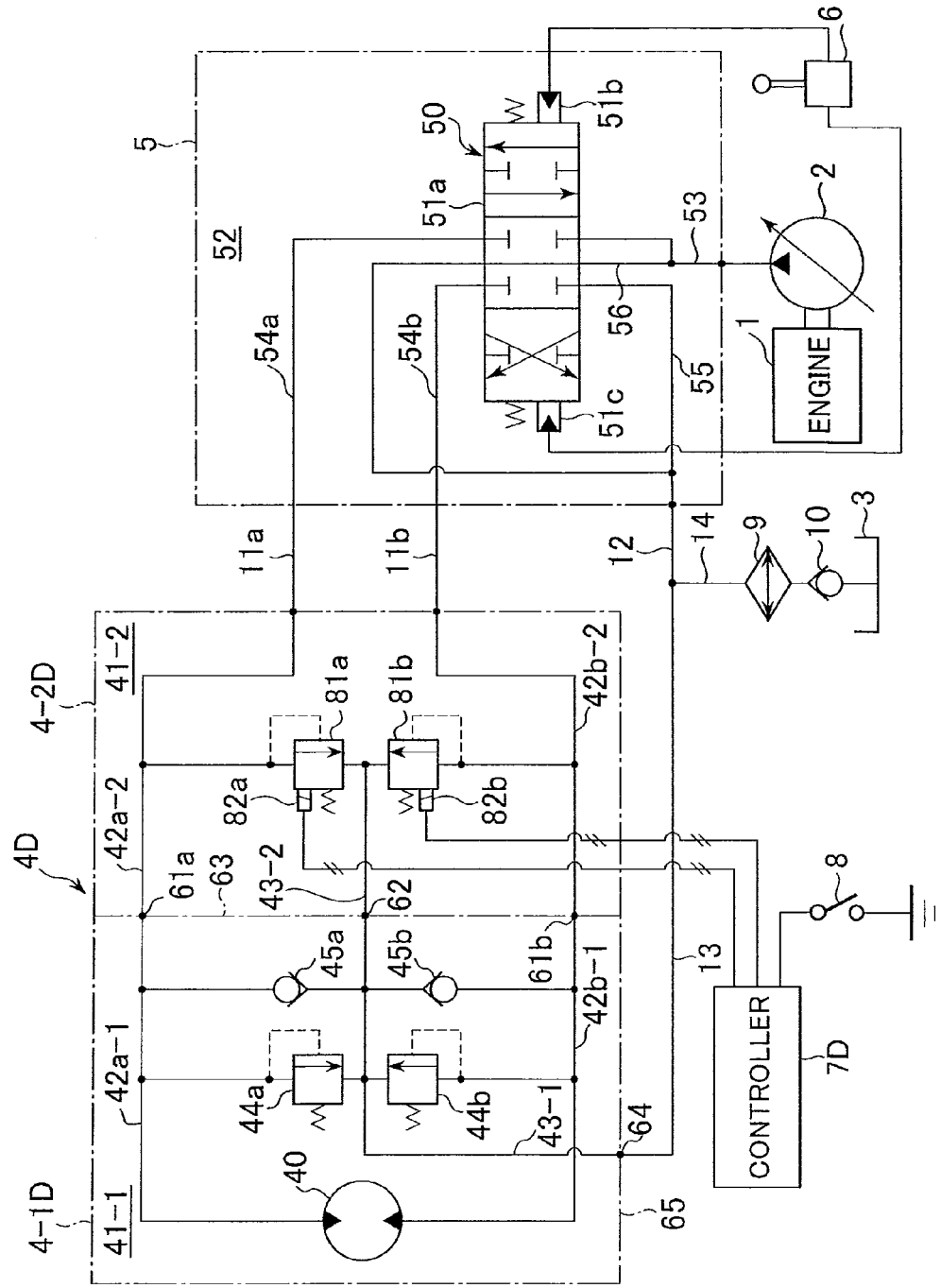
FIG. 7 is a diagram showing a hydraulic drive system for a hydraulic working machine according to a fifth embodiment of the present invention.

FIG. 7 is a diagram showing a hydraulic drive system for a hydraulic working machine according to a fifth embodiment of the present invention. In the figure, the same reference numbers are assigned to members equivalent to those shown in FIGS. 1 and 4.

Referring to FIG. 7, a swing motor unit 4D is constituted primarily by the swing motor section 4-1 and a relief valve section 4-2D. The relief valve section 4-2D is equivalent to one pair of variable-swing relief valves 81a, 81b existing when replaced by the paired second swing relief valves 46a, 46b not having the shockless function and the paired solenoid-operated changeover valves 47a, 47b in the relief valve section 4-2 included in the second embodiment of FIG. 4. The paired variable-swing relief valves 81a, 81b each include a solenoid 82a, 82b, to which a command is supplied from a controller 7D.

Figure 8:
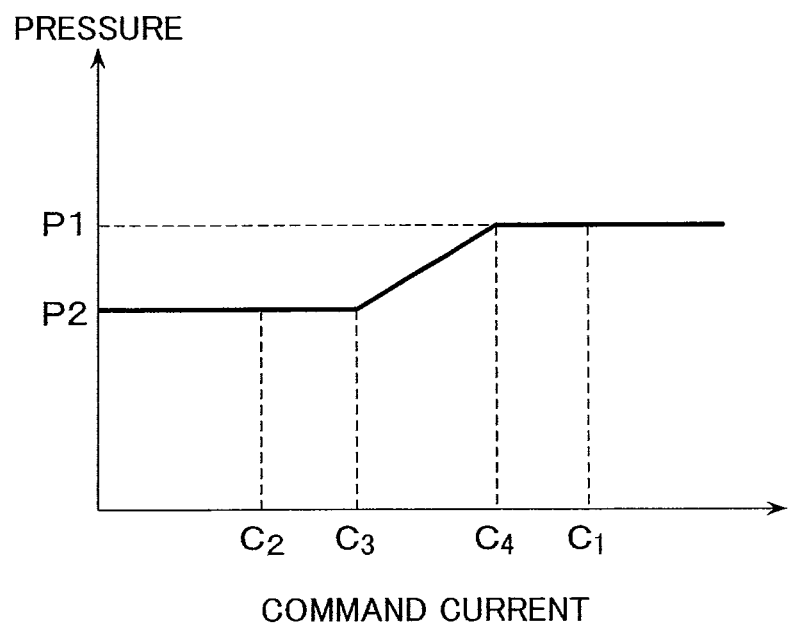
FIG. 8 is a diagram presenting a relationship between a command current and relief pressure in the fifth embodiment of the present invention.

FIG. 8 is a diagram presenting a command current—relief pressure relationship. A horizontal axis denotes a command current, and a vertical axis denotes a relief pressure. The first setting pressure is shown as P1, the second setting pressure is shown as P2, the command current under the OFF state of the relief pressure change instructing switch 8 (i.e., the selected state of the first relief mode) is shown as C1, and the command current under the ON state of the relief pressure change instructing switch 8 (i.e., the selected state of the second relief mode) is shown as C2.

The variable-swing relief valves 81a, 81b are constructed to allow the relief pressure to be changed from the first setting pressure P1 to the second setting pressure P2 using the command current supplied from the controller 7D. In addition, when the relief pressure change instructing switch 8 is in the OFF position (the first relief mode is selected), the controller 7D supplies a command current C1 to the solenoids 82a, 82b to set a relief pressure of the first setting pressure P1. When the relief pressure change instructing switch 8 is in the ON position (the second relief mode is selected), the controller 7D supplies a command current C2 to the solenoids 82a, 82b to set a relief pressure of the second setting pressure P2.

In the present embodiment of the above construction, when the relief pressure change instructing switch 8 is in the OFF position, the relief characteristics of the first swing relief valves 44a, 44b also remain operative intact (in the first relief mode). In addition, changing the setting position of the relief pressure change instructing switch 8 to ON provides the relief characteristics obtained (in the second relief mode) by reducing the first setting pressure P1 of the relief characteristics of the first swing relief valves 44a, 44b to the second setting pressure P2 of the variable-swing relief valves 81a, 81b (second swing relief valves). The present embodiment yields substantially the same advantageous effects as obtained in the first and second embodiments.

Additionally, the paired changeover valves 47a, 47b become unnecessary, which in turn reduces the number of parts.

Furthermore, in a case of the variable-swing relief valves 81a, 81b, the command current to be supplied to the solenoids 82a, 82b can be varied between C3 and C4 of FIG. 8 to set a desired relief pressure between the first setting pressure P1 and the second setting pressure P2. Accordingly, replacing the relief pressure change instructing switch 8 with a dial-type setter, for example, allows the dial-type setter to output to the controller 7D an appropriate instruction signal according to a particular rotating position of the setter, and the controller 7D to supply a plurality of different command currents, ranging between C3 and C4 of FIG. 8 to the solenoids 82a, 82b, in response to the instruction signal. This enables at least three different relief pressures to be set, the shockless function to be obtained at each of the relief pressures, and a control range to be expanded.

Moreover, a control signal can be input to the controller 7D, a command current that steplessly varies can be supplied from the controller 7D to the solenoids 82a, 82b, and thus the relief pressure to be varied steplessly. If configured in this form, the hydraulic drive system can, for example, detect a posture (e.g., an angle of the boom 103) of the front work implement 102 shown in FIG. 2. As a result, supplying a detection signal of the angle to the controller 7D as a control signal leads to improvement of operatability since the maximum driving torque or braking torque of the hydraulic swing motor 40 can be changed according to a particular change in an inertial mass of the upper swing structure with the posture of the front work implement.

DESCRIPTION OF REFERENCE NUMBERS

1 Engine
2 Hydraulic pump
3 Hydraulic operating fluid tank
4 Swing motor unit
5 Control valve
6 Control lever device
7 Controller
8 Relief pressure change instructing switch
9 Oil cooler
10 Back-pressure valve
11a, 11b One pair of actuator lines
12 First discharge line
13 Second discharge line
14 Third discharge line
40 Hydraulic swing motor
41 Motor housing
42a, 42b One pair of actuator hydraulic lines
43 Internal discharge hydraulic line
44a, 44b First swing relief valves with shockless function
45a, 45b One pair of check valves for make-up supply
46a, 46b Second swing relief valves without shockless function
47a, 47b One pair of solenoid-operated changeover valves
50 Swing-directional control valve
51a Main spool
51b, 51c Pressure acceptors
52 Valve housing
53 Pump hydraulic line
54a, 54b One pair of actuator hydraulic lines
55 Internal discharge hydraulic line
56 Center-bypass hydraulic line
61a, 61b Ports
62 Port
63 First port surface
64 Port
65 Second port surface
70 Third port surface
71 Port
72 Fourth discharge line
73 Position neighboring the second port surface 65
74a, 74b Ports
75 Fourth port surface
76 Fifth discharge line
81a, 81b One pair of variable-swing relief valves
82a, 82b Solenoids
100 Track structure
101 Swing structure
102 Front work implement
103 Boom
104 Arm
105 Bucket
P1 First setting pressure
P2 Second setting pressure
P0 Starting relief pressure
A Relief characteristics of the first swing relief valves 44a, 44b
A1 Characteristics of the shockless function
B Relief characteristics of the second swing relief valves 46a, 46b
C1-C4 Command currents

The invention claimed is:

1. A hydraulic drive system for a hydraulic working machine equipped with a swing structure and a working implement, the hydraulic drive system comprising:

a hydraulic pump;

a swing motor unit driven by a hydraulic fluid delivered from the hydraulic pump, the motor unit including a hydraulic swing motor for rotating the swing structure;

a control valve including a swing-directional control valve, the control valve controlling flow of the hydraulic fluid supplied from the hydraulic pump to the hydraulic swing motor;

a first swinging relief valve with a shockless function, the first swinging relief valve disposed inside the swing motor unit and connected to an actuator hydraulic line that connects to the swing motor, which limits a driving or braking pressure of the hydraulic swing motor in order to prevent the driving or braking pressure from exceeding a first setting pressure (P1), starts to open at a relief starting pressure (P0) below the first setting pressure (P1), and reduces an increase in internal pressure due to an abrupt increase in the driving or braking pressure;

a second swinging relief valve connected to an actuator hydraulic line in parallel with respect to the first swing relief valve, and which limits the driving or braking pressure of the hydraulic swing motor to prevent the driving or braking pressure from exceeding a second setting pressure (P2) that is lower than the first setting pressure (P1); and a selector for selecting either one of a first relief mode and a second relief mode, wherein in the first relief mode relief characteristics of the first swinging relief valve are left operatively intact, and in the second relief mode the first setting pressure (P1) of the first swinging relief valve is reduced to the second setting pressure (P2) of the second swinging relief valve, wherein the second setting pressure (P2) of the second swinging relief valve is set to a value ranging between the relief starting pressure (P0) and the first setting pressure (P1) of the first swinging relief valve, and wherein the selector includes a changeover valve disposed at an upstream side of the second swing relief valve between the actuator hydraulic line and the second swinging relief valve, and the selector selects the second relief mode by switching the changeover valve to a communicating position and selects the first relief mode by switching the changeover valve to an interrupting position.

2. The hydraulic drive system for a hydraulic working machine according to claim 1, wherein the swing motor unit comprises:

an internal discharge hydraulic line positioned at a downstream side of the first swinging relief valve in which discharge fluid flows therefrom, and the internal discharge hydraulic line is connected to a tank, and a make-up check valve to replenish an intake end of the hydraulic swing motor with hydraulic fluid from the internal discharge hydraulic line when the hydraulic swing motor conducts a pumping action during a slowdown or stop of the swing structure, and wherein the second swinging relief valve is connected at its downstream side to the internal discharge hydraulic line such that during hydraulic fluid replenishing from the make-up check valve, a discharge fluid from the second swinging relief valve joins the discharge fluid of the first swinging relief valve and both are supplied to the make-up check valve.

3. The hydraulic drive system for a hydraulic working machine according to claim 1, further comprising:
   an independent relief valve block including the second swinging relief valve,
   wherein:
   the swing motor unit includes a port surface at which ports of one pair of actuator hydraulic lines connected to the hydraulic swing motor are opened, and
   the independent relief valve block is mounted on the port surface of the swing motor unit and integrated with the motor unit.

4. The hydraulic drive system for a hydraulic working machine according to claim 1, further comprising:
   an independent relief valve block including the second swinging relief valve,
   wherein:
   the control valve includes a port surface at which ports of one pair of actuator hydraulic lines connected to the swing-directional control valve are opened, and
   the independent relief valve block is mounted on the port surface of the control valve and integrated with the control valve.

5. The hydraulic drive system for a hydraulic working machine according to claim 1, wherein:
   the selector includes a solenoid disposed on the second swinging relief valve in order to change the setting pressure of the second swinging relief valve to the first setting pressure (P1) or the second setting pressure (P2), the selector selecting either one of the first relief mode and the second relief mode by controlling an electric current flowing through the solenoid.

6. The hydraulic drive system for a hydraulic working machine according to claim 2, further comprising:
   an independent relief valve block including the second swinging relief valve,
   wherein:
   the swing motor unit includes a port surface at which ports of one pair of actuator hydraulic lines connected to the hydraulic swing motor are opened, and
   the independent relief valve block is mounted on the port surface of the swing motor unit and integrated with the motor unit.

7. The hydraulic drive system for a hydraulic working machine according to claim 2, further comprising:
   an independent relief valve block including the second swinging relief valve,
   wherein:
   the control valve includes a port surface at which ports of one pair of actuator hydraulic lines connected to the swing-directional control valve are opened, and
   the independent relief valve block is mounted on the port surface of the control valve and integrated with the control valve.

8. The hydraulic drive system for a hydraulic working machine according to claim 2, wherein:
   the selector includes a solenoid disposed on the second swinging relief valve in order to change the setting pressure of the second swinging relief valve to the first setting pressure (P1) or the second setting pressure (P2), the selector selecting either one of the first relief mode and the second relief mode by controlling an electric current flowing through the solenoid.

* * * * *